United States Patent
Orth et al.

(10) Patent No.: US 8,496,728 B2
(45) Date of Patent: Jul. 30, 2013

(54) METALLURGICAL PROCESS AND PLANT THEREFOR

(75) Inventors: Andreas Orth, Friedrichsdorf (DE); Michael Stroeder, Neu-Anspach (DE); Jean-Paul Nepper, Friedrichsdorf (DE)

(73) Assignee: Outotec Oyj, Espoo (FI)

( * ) Notice: Subject to any disclaimer, the term of this patent is extended or adjusted under 35 U.S.C. 154(b) by 54 days.

(21) Appl. No.: 12/920,753

(22) PCT Filed: Feb. 12, 2009

(86) PCT No.: PCT/EP2009/000978
§ 371 (c)(1), (2), (4) Date: Sep. 2, 2010

(87) PCT Pub. No.: WO2009/112137
PCT Pub. Date: Sep. 17, 2009

(65) Prior Publication Data
US 2011/0011211 A1  Jan. 20, 2011

(30) Foreign Application Priority Data
Mar. 10, 2008 (DE) .......................... 10 2008 013 505

(51) Int. Cl.
*C21C 5/40* (2006.01)
*B01D 45/18* (2006.01)

(52) U.S. Cl.
USPC .................................. 75/381; 75/386; 95/271

(58) Field of Classification Search
USPC ......................................... 75/381, 386; 95/4
See application file for complete search history.

(56) References Cited

U.S. PATENT DOCUMENTS

| | | | | |
|---|---|---|---|---|
| 4,649,807 A | * | 3/1987 | Aasen et al. | 454/3 |
| 4,985,068 A | * | 1/1991 | Hoffmann et al. | 75/501 |
| 5,601,625 A | | 2/1997 | Ulrich | |
| 5,787,108 A | | 7/1998 | Pavlicevic et al. | |

FOREIGN PATENT DOCUMENTS

| | | |
|---|---|---|
| DE | 3510723 A1 | 10/1985 |
| EP | 0661507 A1 | 7/1995 |
| EP | 0805327 A1 | 11/1997 |
| JP | 2002022368 A | 1/2002 |
| JP | 2002122321 A | 4/2002 |

OTHER PUBLICATIONS

International Search Report for PCT/EP2009/000978 mailed on Jun. 2, 2009.

* cited by examiner

*Primary Examiner* — George Wyszomierski
*Assistant Examiner* — Tima M McGuthry Banks
(74) *Attorney, Agent, or Firm* — Leydig, Voit & Mayer, Ltd.

(57) ABSTRACT

A process for the production and/or treatment of at least one metal in a reactor includes discharging a waste gas stream via a waste gas conduit and after-treating the waste gas stream by supplying a cooling gas and/or a cooling gas mixture. The after-treating includes injecting the cooling gas and/or cooling gas mixture into the waste gas conduit on a side of the waste gas conduit facing the reactor, at a high velocity and substantially tangentially with respect to a main flow direction of the waste gas. A volume of the cooling gas and/or the cooling gas mixture injected into the waste gas conduit is adjusted so as to reduce a mixing temperature below a melting temperature of the molten particles and/or a condensation temperature of the vaporous constituents of the waste gas stream.

13 Claims, 1 Drawing Sheet

METALLURGICAL PROCESS AND PLANT THEREFOR

CROSS REFERENCE TO PRIOR APPLICATIONS

This application is a U.S. National Phase application under 35 U.S.C. §371 of International Application No. PCT/EP2009/000978, filed on Feb. 12, 2009 and which claims benefit to German Patent Application No. 10 2008 013 505.4, filed on Mar. 10, 2008. The International Application was published in English on Sep. 17, 2009 as WO 2009/112137 A1 under PCT Article 21(2).

FIELD

The present invention provides for a metallurgical process for the production and/or treatment of at least one metal or ore in a reactor from which a waste gas stream loaded with molten particles and/or vaporous constituents is discharged via a waste gas conduit and subjected to an after-treatment.

BACKGROUND

In metallurgical processes, waste gases from electric furnaces or similar reactors frequently contain molten particles and/or vaporous constituents which upon cooling and/or oxidation tend to form very fine solid particles which can clog the waste gas conduit by formation of crusts. Such problems resulting from the clogging of the waste gas conduit are known for instance from slag cleaning furnaces in the copper industry, electric furnaces in the secondary metallurgic industry (copper, lead), or plasma furnaces in the production of titanium dioxide slag ($TiO_2$ slag).

To prevent this formation of crusts, it has been proposed to add air to the waste gas stream in the waste gas conduit in a controlled or uncontrolled manner. For example, EP 0 661 507 A1 describes a process wherein a cooled partial stream of a clean gas is admixed to the waste gas stream before its entry into a gas cleaning plant. According to EP 0 661 507 A1, dust particles can additionally be introduced into the waste gas, which serve as condensation nuclei. By condensation of volatile metal compounds on the dust particles, while at the same time cooling the waste gas below a temperature which can lead to the particles being sintered on the inner wall surfaces of the gas conduits, the deposit of condensates on these inner wall surfaces should be avoided. In practice, however, this process has not led to satisfactory results, so that the deposits in the waste gas conduits still have to be removed "by mining" in regular intervals.

SUMMARY

An aspect of the present invention provides an improved process and a plant therefor which reduces or avoids the formation of crusts on the inner wall surface of a waste gas conduit of a metallurgical reactor by molten particles and/or vaporous constituents entrained in the waste gas stream.

In an embodiment, the present invention provides a metallurgical process for the production and/or treatment of at least one metal in a reactor which includes discharging a waste gas stream including at least one of molten particles and vaporous constituents via a waste gas conduit. The waste gas stream is after-treated by supplying at least one of a cooling gas and a cooling gas mixture. The after-treating includes injecting the at least one of a cooling gas and a cooling gas mixture into the waste gas conduit on a side of the waste gas conduit facing the reactor. The injecting is performed at a velocity and substantially tangentially with respect to a main flow direction of the waste gas so as to form a layer of the at least one of a cooling gas and a cooling gas mixture at least on an inner wall surface of the waste gas conduit in a region facing the reactor. The injecting includes adjusting a quantity of the at least one of a cooling gas and a cooling gas mixture injected into the waste gas conduit based on at last one of a temperature and a volume of the waste gas stream, and a material property of at least one of the molten particles and the vaporous constituents of the waste gas stream so as to provide a mixing temperature of the waste gas stream and of the at least one of a cooling gas and a cooling gas mixture below at least one of a melting temperature of the molten particles and a condensation temperature of the vaporous constituents of the waste gas stream. A temperature of the at least one of a cooling gas and a cooling gas mixture is at least 100 K below a temperature of the waste gas stream at an outlet of the reactor.

BRIEF DESCRIPTION OF THE DRAWINGS

The present invention is described in greater detail below on the basis of embodiments and of the drawings in which.

DETAILED DESCRIPTION

Figure 1:
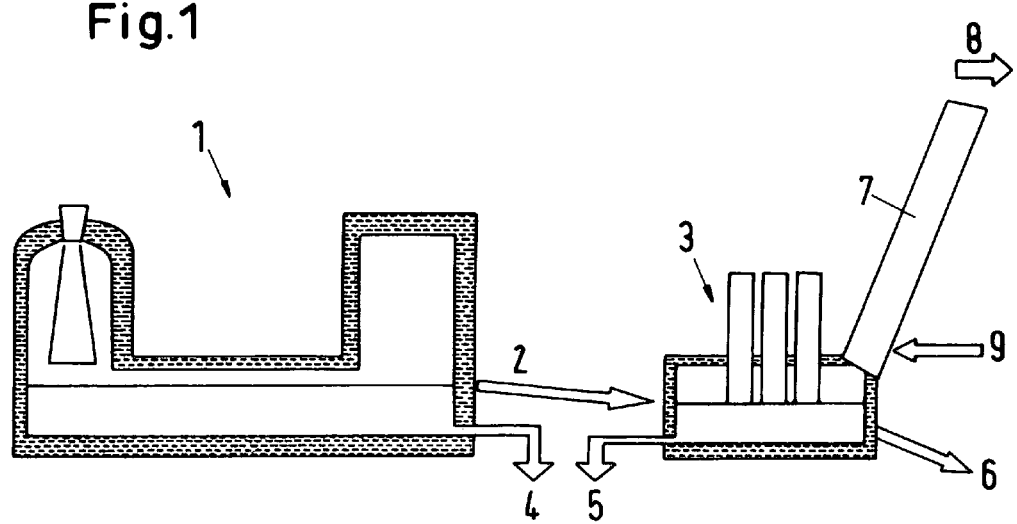
FIG. 1 schematically shows a plant for performing a metallurgical process in accordance with the present invention.

In an embodiment of the present invention, a cooling gas or cooling gas mixture, the temperature of which is lower than that of the waste gas stream, can be substantially tangentially injected into the waste gas conduit with a high velocity on a side of the waste gas conduit facing the reactor. The waste gas conduit thus acts as a gas-gas cooler, by which the hot waste gas can be cooled to a temperature below the condensation and sublimation temperature of the vaporous constituents of the waste gas stream and below the melting temperature of the molten particles. By tangentially injecting the cooling gas or cooling gas mixture, the hot waste gas stream is kept away from the inner wall surface of the waste gas conduit by forming a stable layer of cooling gas between the inner wall surface and the waste gas stream, whereby the formation of crusts can be avoided. Tangentially supplying a cooling gas or cooling gas mixture into the waste gas conduit has the additional advantage that the material of the waste gas conduit is exposed to a considerably lower thermal load. This allows for using inexpensive materials for the waste gas conduit, so that the process of the present invention not only is favorable due to lower maintenance costs in operation, but also allows for a less expensive manufacture of the plant components.

In an embodiment of the present invention, the cooling gas or cooling gas mixture injected into the waste gas conduit is air waste gas. The use of ambient air is recommendable because it is available at low cost and at a comparatively low temperature. If ambient air should not be used for cooling the waste gas stream, for instance to avoid reactions of the waste gas stream with the atmospheric oxygen, cleaned and/or cooled waste gas for cooling the waste gas stream in the waste gas conduit can, for example, be used in some applications. If the waste gas to be used as the cooling gas has a lower temperature than the waste gas from the metallurgical reactor, it can also be used without cooling and washing/cleaning.

In an embodiment of the present invention, a cooling gas or cooling gas mixtures can be used for cooling, the properties of which, for example, composition, thermal capacity or viscosity, can be adapted corresponding to requirements. For instance, water-saturated, cleaned and cooled waste gas can be used for cooling. In addition, the water vapor content of the gas can be adjusted, for example, by specifically adding water droplets. The cleaned waste gas can also be mixed with air or gases or cooled waste gases from other parts of the plant.

In an embodiment of the present invention, the cooling gas or cooling gas mixture can be injected into the waste gas conduit so that at least in a region of the waste gas conduit facing the reactor, a layer of the cooling gas or cooling gas mixture is formed on the inner wall surface of said conduit. The cooling gas or cooling gas mixture cooling the waste gas stream thus keeps the waste gas stream not only away from the inner wall surface of the waste gas conduit, but forms a layer which prevents a direct contact between the waste gas stream and the inner wall surface. This leads to a particularly efficient reduction of the formation of crusts in the waste gas conduit, since tacky and doughy particles do not reach the inner wall surface. Also, the temperature of the wall itself is very low and close to the temperature of the cooling gas, so that dust particles adhering to the wall are not molten or get sticky by contact with the wall.

In an embodiment of the present invention, the cooling gas or cooling gas mixture injected into the waste gas conduit can have a temperature of less than about 200° C., for example, below about 80° C. It can be useful, for example, when the temperature of the cooling gas or cooling gas mixture injected into the waste gas conduit lies between about 0° C. and about 160° C., for example, between 25° C. and 150° C. The temperature of the cooling gas or cooling gas mixture injected into the waste gas conduit can, for example, be chosen in dependence on the temperature of the waste gas stream. In accordance with an embodiment of the present invention, the temperature of the gas or gas mixture can lie at least about 100 K, for example, at least 500 K below the temperature of the waste gas stream at the reactor outlet.

To sufficiently keep the waste gas stream away from the inner wall surface of the waste gas conduit and to form a layer enveloping the waste gas stream between the inner wall surface and the waste gas stream, the gas or gas mixture can be injected into the waste gas conduit with a high velocity. The gas velocity of the gas or gas mixture can, for example, lie at least 50% above the gas velocity of the waste gas stream in the waste gas conduit. The gas velocity of the gas or gas mixture injected into the waste gas conduit can, for example, be between about 20 and 100 m/s, such as between 30 and 90 m/s, or between 40 and 60 m/s.

Another feature of the gas-gas-cooler is the mixing of and heat exchange between the hot waste gas on the one hand and the cooling gas on the other hand. Ideally the two streams are completely mixed and assume a homogeneous mixing temperature at the end of the gas-gas-cooler.

When the waste gas conduit acting as gas-gas cooler is formed only comparatively short and/or the cooling performance is not sufficient, clogging of the waste gas conduit itself can largely be prevented, but a risk can exist that parts of the plant downstream of the waste gas conduit or the feed conduits can be clogged by adhering molten particles or sticky dust formed out of vaporous constituents by condensation/sublimation. In the process of the present invention, the quantity and temperature of the cooling gas or cooling gas mixture injected into the waste gas conduit can therefore be adjusted to the temperature and quantity of the waste gas stream and/or to the material properties of the molten particles or vaporous constituents of the waste gas stream so that the highest temperature of the mixed gas stream leaving the gas-gas cooler lies below the melting temperature of the molten particles and/or below the condensation temperature of the vaporous constituents of the waste gas stream. It may be necessary to cool below a critical temperature at which the dusts begin to become sticky. This temperature often is below the melting point of the molten particles. In practical applications, the two gas streams are not completely mixed and the length of the waste gas conduit acting as gas-gas cooler is chosen so that the temperature difference between the hot waste gas stream and the enveloping layer at the end of the waste gas conduit facing away from the reactor lies below 100 K, for example, below 60 K.

In the present invention, the term "vaporous constituents" refers, for example, to those vaporous constituents of the waste gas which upon cooling can condense or sublime in the waste gas conduit, for example, whose condensation/sublimation point or condensation/sublimation temperature lies below the reactor temperature, but above the gas temperature in the waste gas conduit, for example, the gas temperature of the cooling gas supplied.

The process of the present invention is suitable for cooling the waste gas of different metallurgical processes in which the waste gas is loaded with molten particles and/or vaporous constituents. The process of the present invention can, for example, be used for slag cleaning furnaces in the copper and nickel industries, in electric furnaces in the secondary metallurgy (copper, lead), and for plasma/electric furnaces in the production of $TiO_2$ slag. Further fields of use include, for example, the electric furnaces and the converters for producing steel, stainless steel, pig iron and ferro-alloys, electric-resistance furnaces, electric-arc furnaces, blast furnaces or melt reduction furnaces. For instance, ferro-alloys such as ferronickel, ferrochromium can be produced in an electric-resistance furnace or electric-arc furnace.

In an embodiment, the present invention provides a plant which is suitable for performing the process described above. In accordance with the present invention, this plant includes a reactor for the treatment of ores and/or metals and a waste gas after-treatment stage associated to the reactor for cooling and/or cleaning a waste gas stream from the reactor, which is loaded with molten particles and/or vaporous constituents. To form a gas-gas cooler, the waste gas after-treatment stage is equipped with a supply means for supplying cooling gas or a cooling gas mixture into a waste gas conduit for the waste gas stream. In accordance with the present invention, the supply means is formed and arranged so that at least in a portion of the waste gas conduit facing the reactor the cooling gas or cooling gas mixture forms a gas layer enveloping the waste gas stream on the inner wall surface of the waste gas conduit. This layer should be present at least as long as the temperature of the waste gas is below the critical temperature mentioned above. This configuration of the supply means of the plant in accordance with the present invention effects that the waste gas conduit cannot be clogged with the molten particles or vaporous constituents of the waste gas, that the cooling gas layer enveloping the waste gas stream forms a layer between the waste gas stream and the inner wall surface of the waste gas conduit, which largely prevents a contact of the waste gas stream with the inner wall surface and cools the inner wall surface.

In accordance with the present invention, this can be achieved efficiently in that the supply means includes a nozzle assembly and/or a confusor for injecting cooling gas or a cooling gas mixture into the waste gas conduit with a high velocity, wherein the nozzle assembly is aligned relative to the waste gas conduit so that the cooling gas or cooling gas mixture can be injected into the waste gas conduit substantially tangentially with respect to the main direction of the waste gas stream. The nozzle assembly can, for instance, be arranged annularly around the waste gas conduit with a plurality of individual nozzles. Alternatively, it is also possible to provide lances or the like, which extend into the waste gas conduit and are aligned such that a substantially tangential flow of the cooling gas or cooling gas mixture into the waste gas conduit can be effected. The confusor can have a slotted opening whose dimension in the longitudinal direction of the waste gas conduit is greater than in radial direction.

To be able to efficiently avoid crusts or deposits in the waste gas conduit, the waste gas conduit can, for example, be formed substantially rectilinear at least in a first portion downstream of the supply means. Hence it is possible that a particularly stable layer enveloping the waste gas stream can be formed out of the tangentially injected cooling gas or cooling gas mixture. Only when the waste gas stream has been cooled to such an extent that the risk of clogging of the waste gas conduit is minimized, can the conduit change direction, for example, by means of a segmented elbow.

For this purpose, the waste gas conduit acting as gas-gas cooler has a sufficient length, which in many applications is at least 4 to 8 times the diameter. The straight portion of the waste gas conduit can, for example, have a length of at least 5 to 6 times the diameter. The supply means also can be formed such that the cooling gas or cooling gas mixture is not only introduced into the waste gas conduit at one point, but is distributed along a certain length of the waste gas conduit by means of a confusor. Alternatively or in addition, it is also possible to provide a plurality of supply means spaced from each other along the straight portion of the waste gas conduit in order to maintain a stable layer enveloping the waste gas stream.

A particularly inexpensive design of the plant in accordance with the present invention becomes possible if at least the waste gas conduit is made of carbon steel or a low alloy steel. Without the present invention, the waste gas conduit would have to be made of a particularly temperature-resistant and therefore expensive material, in order to be able to safely discharge the hot waste gas stream, which frequently has temperatures above 1000° C. In accordance with the present invention, the gas layer enveloping the waste gas stream provides for a defined cooling of the inner wall surface of the waste gas conduit, which allows the use of less expensive, non-high-temperature-resistant materials for the waste gas conduit.

In accordance with an embodiment of the present invention, a blower for supplying cooling gas, for example, air, and/or for supplying cooled and/or cleaned waste gas is associated to the supply means. Hence it is achieved that via the supply means the cooling gas or cooling gas mixture can be introduced into the waste gas conduit with a high velocity, whereby a gas layer enveloping the waste gas stream can be formed along a particularly long distance. Upon cleaning in a gas washer downstream of the waste gas conduit, part of the waste gas stream can be recycled, potentially after further cooling, in order to again be introduced into the waste gas conduit via the supply means as a cooling gas mixture.

On the left side in FIG. 1, a suspension furnace 1 is indicated, in which, for example, for obtaining copper, concentrate is molten by adding silicates to obtain copper matte and an iron silicate slag. The slag, which contains, for example, about 2% copper, is supplied to a slag cleaning furnace 3, as indicated by the arrow 2 in FIG. 1. The copper matte, which has a high copper content, then is withdrawn from the suspension furnace 1, as indicated by the arrow 4.

From the slag cleaning furnace 3, copper matte is withdrawn, as indicated by the arrow 5. The slag designated by the arrow 6, which is discharged from the slag cleaning furnace 3, only has a low copper content of e.g. less than 1%.

The waste gases of the slag cleaning furnace 3 are discharged through a waste gas conduit 7. The waste gases here can have a temperature of, for example, about 1200° C. The waste gas stream flowing through the waste gas conduit 7 is in part loaded with molten particles and vaporous constituents. Downstream of the waste gas conduit 7, there is provided a waste gas treatment stage indicated by the arrow 8, which, for instance, includes a gas washer and/or further cooling stages.

To avoid clogging of the waste gas conduit 7 by the molten particles or vaporous constituents entrained in the hot waste gas stream, a cooling gas stream indicated by the arrow 9 is injected with a high velocity on the side of the waste gas conduit 7 facing the slag cleaning furnace 3. This is effected for instance via a confusor 10 shown in FIGS. 2 and 3 or via a nozzle assembly such that the cooling gas is introduced into the waste gas conduit 7 substantially tangentially, so that a veil or a cooling gas layer enveloping the waste gas stream is formed on the inner wall surface of the waste gas conduit 7.

Along the waste gas conduit 7, which, for instance, can have a length of about 17 m, the cooling gas stream enveloping the waste gas stream gradually mixes with the waste gas, so that on the side facing away from the slag cleaning furnace 3, the waste gas stream is cooled, for instance, from about 1200° C. to about 500° C. to 600° C. The waste gas conduit 7 thus forms a gas-gas cooler for the waste gases from the slag cleaning furnace 3.

The quantity and temperature of the cooling gas stream 9 injected into the waste gas conduit 7 is adjusted to the temperature and the quantity of the waste gas stream and the material properties of the molten particles or vaporous constituents entrained therein so that the mixing temperature of the waste gas stream and of the cooling gas stream 9 lies below the melting temperature of the molten particles or below the condensation temperature of the vaporous constituents of the waste gas stream, whereby a formation of crusts in the waste gas conduit 7 can be avoided.

The length of the gas-gas cooler results from the required distance which is necessary, until a certain mixing combined with temperature compensation of the two gas streams has occurred inside the waste gas conduit 7. A deflection of the waste gas stream only is effected after this temperature compensation is effected, for example, at the end of the waste gas conduit 7 facing away from the slag cleaning furnace 3.

Figure 2:
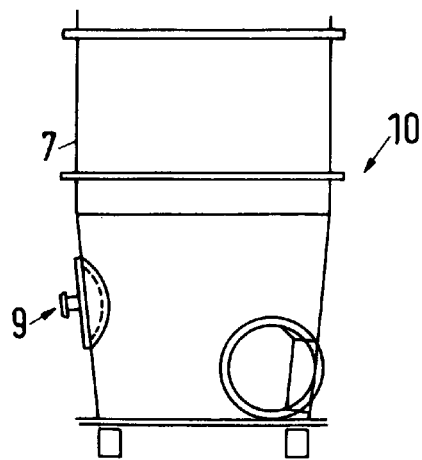
FIG. 2 schematically shows a side view of a confusor for a plant in accordance with the present invention.

FIG. 2 shows an embodiment of the introduction of the cooling gas stream into the waste gas conduit by means of a confusor 10. By way of example, there is only shown a supply conduit for cooling gas at one point. The cooling gas conduit 9 tangentially enters into the waste gas conduit 7 at the edge thereof. In this special embodiment, the waste gas conduit 7 has a reduced cross-section at the entry point.

Figure 3:
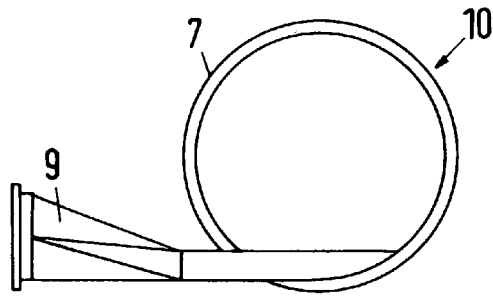
FIG. 3 schematically shows a section through the confusor of FIG. 2.

FIG. 3 shows a section through the confusor 10 of FIG. 2, wherein in the illustrated embodiment the cooling gas conduit 9 is tapered before entry into the waste gas conduit. The cooling gas then is tangentially introduced into the waste gas conduit 7.

The present invention is not limited to embodiments described herein; reference should be had to the appended claims.

LIST OF REFERENCE NUMERALS 1 suspension furnace
2 slag 3 slag cleaning furnace
4 matte
5 matte
6 slag
7 waste gas conduit (gas-gas cooler)
8 waste gas aftertreatment
9 cooling gas supply
10 confusor

The invention claimed is:

1. A metallurgical process for the production and/or treatment of at least one metal in a reactor, the process comprising:
discharging a waste gas stream including at least one of molten particles and vaporous constituents via a waste gas conduit; and
after-treating the waste gas stream by supplying at least one of a cooling gas and a cooling gas mixture, the after-treating comprising injecting the at least one of a cooling gas and a cooling gas mixture into the waste gas conduit on a side of the waste gas conduit facing the reactor, the injecting being performed at a velocity and substantially tangentially with respect to a main flow direction of the waste gas so as to form a layer of the at least one of a cooling gas and a cooling gas mixture at least on an inner wall surface of the waste gas conduit in a region facing the reactor, the injecting including adjusting a quantity of the at least one of a cooling gas and a cooling gas mixture injected into the waste gas conduit based on at last one of:
a temperature and a volume of the waste gas stream, and
a material property of at least one of the molten particles and the vaporous constituents of the waste gas stream
so as to gradually mix the waste gas stream and the at least one of a cooling gas and a cooling gas mixture along a length of the waste gas conduit and provide a mixing temperature of the waste gas stream and of the at least one of a cooling gas and a cooling gas mixture below at least one of a melting temperature of the molten particles and a condensation temperature of the vaporous constituents of the waste gas stream,
wherein a temperature of the at least one of a cooling gas and a cooling gas mixture is at least 100 K below a temperature of the waste gas stream at an outlet of the reactor, and wherein a temperature difference between the waste gas stream and the least one of a cooling gas and a cooling gas mixture at an end of the waste gas conduit facing away from the reactor is less than 100 K.

2. The process as recited in claim 1, wherein the temperature of the at least one of a cooling gas and a cooling gas mixture injected into the waste gas conduit is at least 500 K below the temperature of the waste gas stream at the outlet of the reactor.

3. The process as recited in claim 1, wherein the at least one of a cooling gas and a cooling gas mixture injected into the waste gas conduit includes at least one of air and waste gas.

4. The process as recited in claim 1, wherein the temperature of the at least one of a cooling gas and a cooling gas mixture injected into the waste gas conduit is less than about 200° C.

5. The process as recited in claim 4, wherein the temperature of the at least one of a cooling gas and a cooling gas mixture injected into the waste gas conduit is between about 0° C. and about 160° C.

6. The process as recited in claim 4, wherein the temperature of the at least one of a cooling gas and a cooling gas mixture injected into the waste gas conduit is below about 80° C.

7. The process as recited in claim 1, wherein the velocity of the at least one of a cooling gas and a cooling gas mixture injected into the waste gas conduit is between about 20 and 100 m/s.

8. The process as recited in claim 7, wherein the velocity of the at least one of a cooling gas and a cooling gas mixture injected into the waste gas conduit is between about 30 and 90 m/s.

9. The process as recited in claim 7, wherein the velocity of the at least one of a cooling gas and a cooling gas mixture injected into the waste gas conduit is between about 40 and 60 m/s.

10. The process as recited in claim 1, further comprising performing a reaction in at least one of a slag cleaning furnace and a plasma furnace.

11. The process as recited in claim 1, further comprising performing a reaction in at least one of an electric-resistance furnace, an electric-arc furnace, a converter, a blast furnace and a melt reduction furnace.

12. The process as recited in claim 1, wherein a first portion of the waste gas conduit downstream of the outlet of the reactor is a straight portion having a length that is selected so as to obtain the temperature difference and is at least 4 to 8 times a diameter of the waste gas conduit.

13. A metallurgical process for the production and/or treatment of at least one metal in a reactor, the process comprising:
discharging a waste gas stream including at least one of molten particles and vaporous constituents via a waste gas conduit; and
after-treating the waste gas stream by supplying at least one of a cooling gas and a cooling gas mixture, the after-treating comprising injecting the at least one of a cooling gas and a cooling gas mixture into the waste gas conduit on a side of the waste gas conduit facing the reactor, the injecting being performed at a velocity and substantially tangentially with respect to a main flow direction of the waste gas so as to form a layer of the at least one of a cooling gas and a cooling gas mixture at least on an inner wall surface of the waste gas conduit in a region facing the reactor, the injecting including adjusting a quantity of the at least one of a cooling gas and a cooling gas mixture injected into the waste gas conduit based on at last one of:
a temperature and a volume of the waste gas stream, and
a material property of at least one of the molten particles and the vaporous constituents of the waste gas stream
so as to completely mix the waste gas stream and the at least one of a cooling gas and a cooling gas mixture and provide a homogenous mixing temperature of the waste gas stream and of the at least one of a cooling gas and a cooling gas mixture at an end of the waste gas conduit that is below at least one of a melting temperature of the molten particles and a condensation temperature of the vaporous constituents of the waste gas stream.

* * * * *